United States Patent
Wynne

[19]

[11] Patent Number: 5,976,627
[45] Date of Patent: Nov. 2, 1999

[54] FORMING A CONTINUOUS REINFORCED COMPOSITE MATERIAL

[75] Inventor: Lyndell Kyle Wynne, Kingwood, Tex.

[73] Assignee: Reef Industries, Inc., Houston, Tex.

[21] Appl. No.: 09/093,144

[22] Filed: Jun. 8, 1998

Related U.S. Application Data

[62] Division of application No. 08/665,644, Jun. 18, 1996.

[51] Int. Cl.$^6$ ........................................................ B05D 3/02
[52] U.S. Cl. ........................ 427/375; 427/372.2; 427/384; 427/258; 427/322; 427/389.9
[58] Field of Search ................................ 427/375, 372.2, 427/384, 258, 322, 389.9

[56] References Cited

U.S. PATENT DOCUMENTS

| | | |
|---|---|---|
| 1,914,801 | 6/1933 | Chadwick . |
| 2,851,389 | 9/1958 | Lappala . |
| 2,962,080 | 11/1960 | Hirsch . |
| 3,156,027 | 11/1964 | Wellman . |
| 3,169,087 | 2/1965 | Van Ness et al. . |
| 3,186,893 | 6/1965 | Mercer . |
| 3,214,320 | 10/1965 | Lappala et al. . |
| 3,223,761 | 12/1965 | Raley . |
| 3,272,679 | 9/1966 | Hebberling . |
| 3,332,823 | 7/1967 | Van Ness . |
| 3,332,824 | 7/1967 | Sheffield . |
| 3,404,748 | 10/1968 | Bjorksten . |
| 3,414,453 | 12/1968 | Carter . |
| 3,467,565 | 9/1969 | Utz . |
| 3,496,053 | 2/1970 | Bascom et al. . |
| 3,511,739 | 5/1970 | Hebberling . |
| 3,523,856 | 8/1970 | Yaeger . |
| 3,616,130 | 10/1971 | Rogosch et al. . |
| 3,644,165 | 2/1972 | Chen . |
| 3,686,062 | 8/1972 | Romanin . |
| 3,791,911 | 2/1974 | Yaeger et al. . |
| 3,805,341 | 4/1974 | Jense . |
| 3,950,583 | 4/1976 | Patin . |
| 4,088,805 | 5/1978 | Wiegand . |
| 4,106,261 | 8/1978 | Greenawalt . |
| 4,161,559 | 7/1979 | Bosse . |
| 4,397,703 | 8/1983 | Osborn . |
| 4,592,941 | 6/1986 | Emmons ................................ 428/113 |
| 5,328,743 | 7/1994 | Wynne et al. . |
| 5,507,900 | 4/1996 | Mohammed et al. . |

Primary Examiner—Richard Weisberger
Attorney, Agent, or Firm—Jenkens & Gilchrist, P.C.

[57] ABSTRACT

A continuous reinforced composite material, including a first sheet with at least two polymer layers and a first fabric layer operatively coupled therebetween. The first sheet having at least one border where at least some of the fibers of the first fabric layer are continuous thereby having no free ends at the border. The composite material further includes a second sheet with at least two polymer layers with a second fabric layer operatively coupled therebetween. The second sheet having at least one border where at least some of the fibers of the second fabric layer are continuous thereby having no free ends at the border. The composite material further includes a seam wherein the borders of the first sheet and second sheet overlap and are operatively coupled to one another. A method of making a continuous reinforced composite material, including providing a first sheet having two polymer layers and a reinforcing fabric layer disposed between the polymer layers, the fabric layer having at least some continuous fibers without free ends on at least one border of the first sheet. The method further includes providing a second sheet having two polymer layers and a reinforcing fabric layer disposed between the polymer layers, the fabric layer having at least some continuous fibers without free ends on at least one border of the second sheet. The method further includes overlapping the respective borders having continuous fibers of the first and second sheet and seaming the first sheet and the second sheet at the overlapping borders.

8 Claims, 7 Drawing Sheets

FORMING A CONTINUOUS REINFORCED COMPOSITE MATERIAL

This is a divisional of U.S. application Ser. No. 08/665,644, filed Jun. 18, 1996.

BACKGROUND

This invention relates to forming a continuous reinforced composite material.

Reinforced composite materials (e.g., reinforced thermoplastics) are used in a wide variety of industrial, transportation, and engineering applications. For example, composite materials may be used for lining containers (e.g., cargo hulls and landfills) or for covering, protecting, and containing materials (e.g., during transportation in ships, trucks, and rail cars, and during storage either within or outside containers). Reinforced thermoplastics may be made with a reinforcing grid interposed between two or more polymer films to enhance the physical properties of the thermoplastic material. The reinforcing grid is typically a scrim of woven or nonwoven fabric around which the polymer films are bonded or laminated.

The reinforced laminates are typically manufactured as mill roll goods in a variety of widths and lengths depending on the machine or machines involved in the lamination process. Typical roll good widths may range from one to twenty feet, while roll good lengths may vary from one hundred to ten thousand feet. In many applications, the surface area to be lined or covered exceeds the size or is incompatible with the shape in which sections of the reinforced thermoplastic material may be economically manufactured. In such cases, the reinforced laminates are seamed together to achieve the desired shape and size. The reinforced laminates are first overlapped to the extent necessary for a particular seaming process (e.g., heat, hot air, wedge, or radio frequency). A seam is then formed by bonding the two reinforced laminates together to create a continuous reinforced composite material. However, when using existing reinforced composite materials and methods of seaming, the seam may not retain the performance characteristics (e.g., tear resistance) of the individual sections of the reinforced laminate, thereby leading to areas having increased susceptibility to operational failure.

Figure 10:
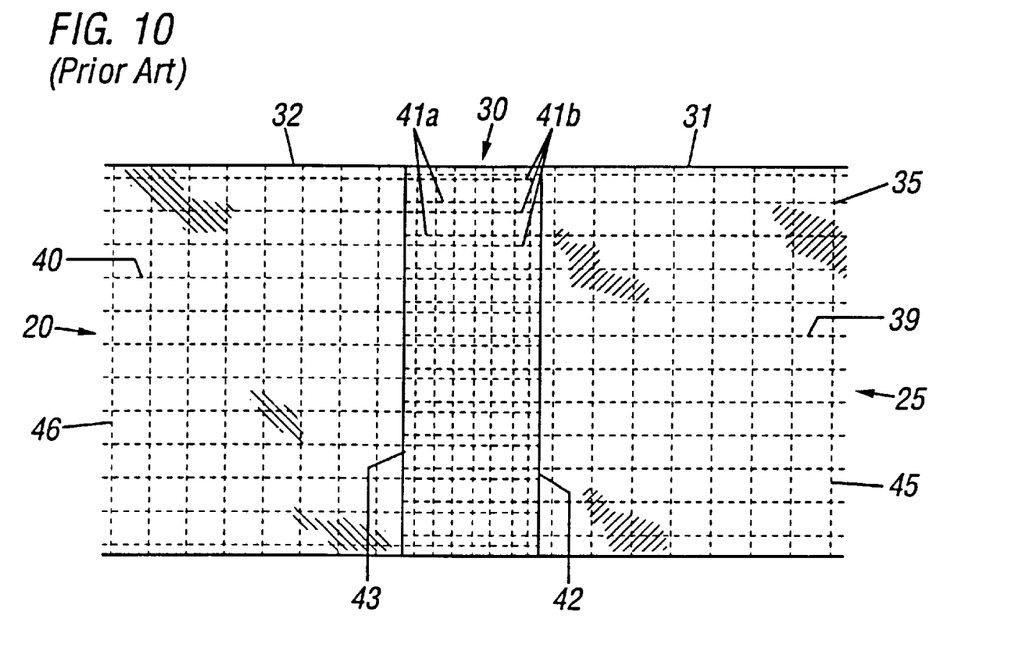
FIG. 10 is a top view of a continuous reinforced composite material of the prior art.

For example, referring to FIG. 10, two sheets of reinforced thermoplastic material 20, 25 may be overlapped and coupled to form a seam 30. Each sheet of reinforced thermoplastic material 20, 25 may include two or more layers of a polymer film 31, 32 between which is coupled a scrim 35 of horizontal reinforcing fibers 39, 40 (i.e., oriented in the width or fill direction of the mill roll good) and longitudinal reinforcing fibers 45, 46 (i.e., oriented in the linear or machine direction of the mill roll good). During manufacture, the scrim 35 of the reinforced thermoplastic material 20, 25 extends across the width of the mill roll good such that the horizontal reinforcing fibers 39, 40 terminate in free ends 41a, 41b.

Figure 11:
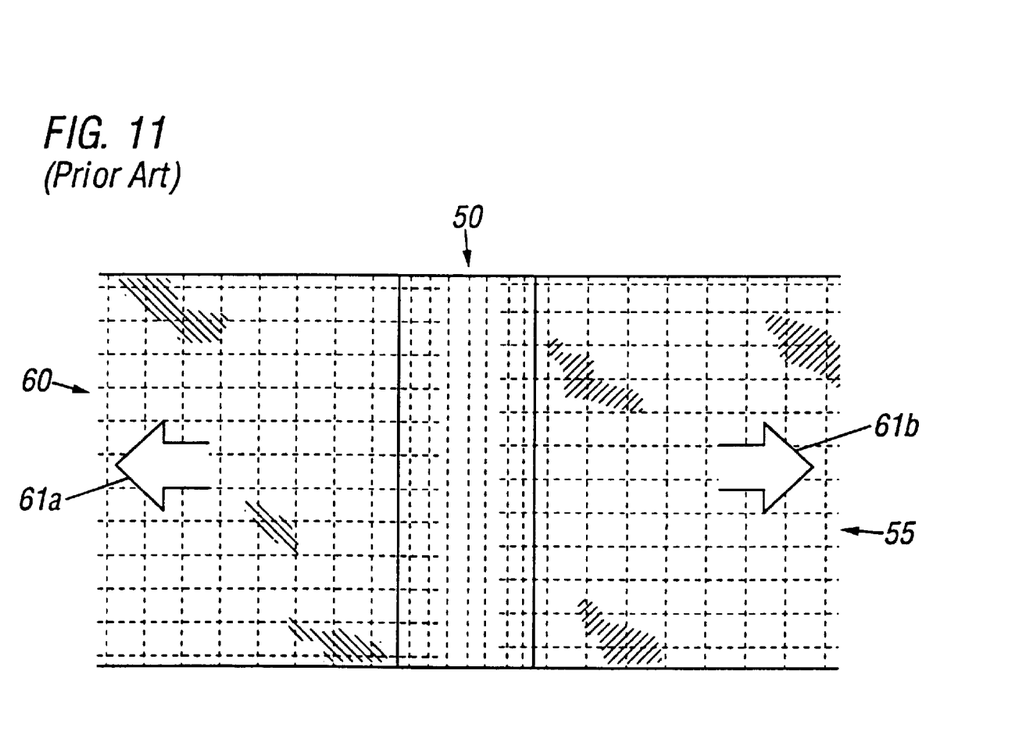
FIG. 11 is a top view of a continuous reinforced composite material of the prior art under longitudinal tension.
Figure 12:
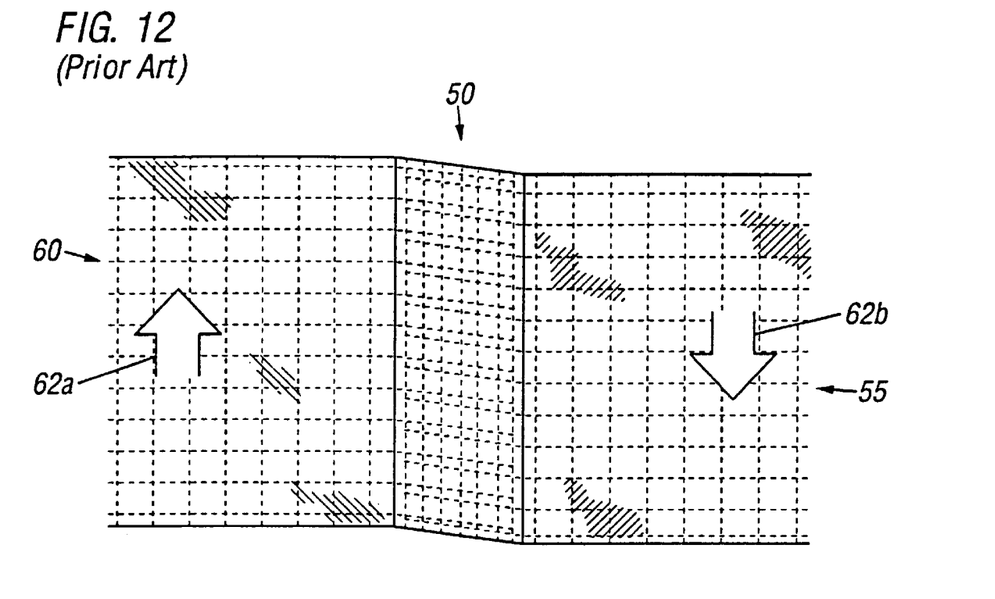
FIG. 12 is a top view of a continuous reinforced composite material of the prior art under horizontal tension.
Figure 13:
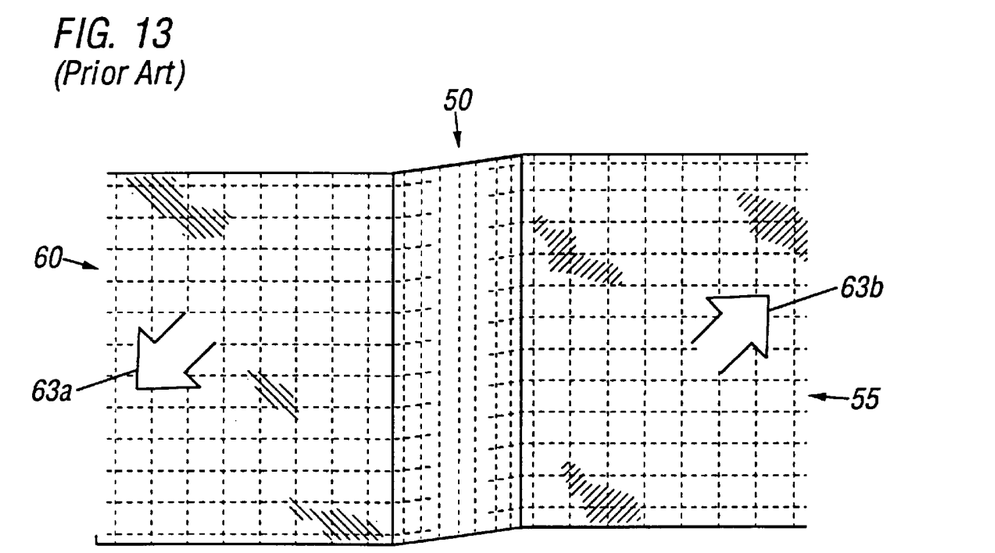
FIG. 13 is a top view of a continuous reinforced composite material of the prior art under diagonal tension.

When a seam 30 is formed by overlapping the borders 42, 43 containing the horizontal reinforcing fibers 39, 40 having free ends 41a, 41b, the tensile strength of the seamed material may be reduced significantly (e.g., approximately 30%) as compared to the individual sheets. The strength of the seam 30 is dependent primarily on the type of seam created, the width of the seam, and the bonding properties of the polymer films and not the strength of the reinforcing fibers of the scrim. Therefore, referring to FIGS. 11, 12 and 13, a seam 50 formed between two sheets of such a reinforced thermoplastic material 55, 60 may demonstrate horizontal and/or longitudinal fiber pull from the seam and separation when exposed to longitudinal, horizontal, and diagonal tensile forces, (e.g., as depicted by arrows 61a, 61b, 62a, 62b, 63a, and 63b, respectively). The separation of the reinforcing fibers renders the seamed material susceptible to operational failure.

SUMMARY

In general, in one aspect, the invention features a continuous reinforced composite material including a first sheet with at least two polymer layers and a first fabric layer operatively coupled therebetween, the first sheet having at least one border where at least some of the fibers of the first fabric layer are continuous thereby having no free ends at the border, a second sheet with at least two polymer layers and a second fabric layer operatively coupled therebetween, the second sheet having at least one border where at least some of the fibers of the second fabric layer are continuous thereby having no free ends at the border, and a seam wherein the borders of the first sheet and second sheet overlap and are operatively coupled to one another.

Implementations of the invention include one or more of the following features. The continuous reinforced composite material includes: a tie layer disposed with the fabric layer between the polymer layers in at least one of the sheets; the tie layer includes a polymer with a lower modulus than the polymers in the first sheet and the second sheet; the polymer layers in at least one of the first and second sheets are operatively coupled by heat laminating; at least one of the polymer layers of the sheets being selected from polypropylene, ethylene acrylic acid, polyvinyl chloride, ethylene-vinyl acetate copolymer, ethylene-propylene-diene, high density polyethylene, low density polyethylene, linear low density polyethylene, or mixtures thereof; at least one of the polymer layers of the sheets comprises a multi-ply polymer layer; one of the plys of at least one of the polymer layers includes a polymer composition which differs from another of the plys; at least one of the polymer layers of the sheets includes an additive selected from flame retardants, static retardants, corrosion retardants, pigments, ultraviolet absorbers, ultraviolet stabilizers, biocides, fillers, extenders, antioxidants, vulcanizers, impact modifiers, or combinations thereof; one of the plys includes an additive composition which differs from the additive composition in another of the plys; at least one of the first and second fabric layers includes a material selected from synthetic fibers, natural fibers, or mixtures thereof; one of the fabric layers includes fibers of nylon, fiberglass, aramid polyester, or combinations thereof; at least one of the first and second fabric layers includes non-woven fibers; at least one of the fabric layers includes fibers arranged in a grid pattern with at least some fibers in continuous loops at the border of the sheet; the fibers of the fabric layers have essentially no free ends at the borders, include a pattern at the borders selected from an arc, a tapered point, a square, multiple loops, corrugations, or combinations thereof, and include a grid pattern between the borders; the fibers of the fabric layer having at least some continuous fibers at the border include a pattern of arcs at the border; the tie layer further includes an additive selected from flame retardants, static retardants, corrosion retardants, pigments, ultraviolet absorbers, ultraviolet stabilizers, biocides, fillers, extenders, antioxidants, vulcanizers, impact modifiers, or combinations thereof; and the first and the second borders are operatively coupled by a method selected from laminating, heat seaming, ultrasonic seaming, factory solvent seaming, electrical conduction seaming, electromagnetic induction seaming, electrical resistance seaming, electrical resistance heating, or combinations thereof.

In general, in one aspect, the invention features a continuous reinforced composite material including a first sheet having a first fabric layer, the first fabric layer being interposed between and operatively coupled to a first and a second polymer layer, the first sheet having multiple borders where at least some of the fibers of the first fabric layer are continuous thereby having no free ends, a second sheet including a second fabric layer, the second fabric layer interposed between and operatively coupled to a third and a fourth polymer layer, the second sheet having multiple borders where at least some of the fibers of the second fabric layer are continuous thereby having no free ends, and a seam operatively coupling the overlap of one of the borders of the first sheet and the second sheet where at least some of the fibers are continuous.

Implementations of the invention include one or more of the following features. The continuous reinforced composite material includes: the polymer layers in at least one of the first and second sheets are operatively coupled by heat lamination; at least one of the polymer layers is selected from polypropylene, ethylene acrylic acid, polyvinyl chloride, ethylene-vinyl acetate copolymer, ethylene-propylene-diene, high density polyethylene, low density polyethylene, linear low density polyethene, or mixtures thereof; at least one of the polymer layers includes a multi-ply polymer layer; one of the plys includes a polymer composition which differs from another of the plys; one of the plys includes an additive selected from flame retardants, static retardants, corrosion retardants, pigments, ultraviolet absorbers, ultraviolet stabilizers, biocides, fillers, extenders, antioxidants, vulcanizers, impact modifiers, or combinations thereof; one of the plys of the first polymer layer includes an additive or mixture of additives which differs from another of the plys; at least one of the fabric layers is selected from nylon, fiberglass, polyester, or combinations thereof; at least one of the fabric layers includes non-woven fibers; the fibers at the borders include a pattern of arcs; the first fabric layer includes at least one continuous fiber traversing the first sheet between opposing borders; a tie layer disposed with the fabric layer between the polymer layers in at least one of the sheets; the tie layer further includes an additive selected from flame retardants, static retardants, corrosion retardants, pigments, ultraviolet absorbers, ultraviolet stabilizers, biocides, fillers, extenders, antioxidants, vulcanizers, impact modifiers, or combinations thereof; and the tie layer includes a polymer with a lower modulus than the polymers in the first and second sheets.

In general, in one aspect, the invention features a method of making a continuous reinforced composite material, including the steps of providing a first sheet having two polymer layers and a reinforcing fabric layer disposed between the polymer layers, the fabric layer having at least some continuous fibers without free ends on at least one border of the first sheet, providing a second sheet having two polymer layers and a reinforcing fabric layer disposed between the polymer layers, the fabric layer having at least some continuous fibers without free ends on at least one border of the second sheet, overlapping the respective borders having continuous fibers of the first and second sheet, and seaming the first sheet and the second sheet at the overlapping borders.

Implementations of the invention include one or more of the following features. The method of making a continuous reinforced composite material includes: providing a third sheet having two polymer layers and a reinforcing fabric layer disposed between the polymer layers, the fabric layer having at least some continuous fibers without free ends on at least one border of the third sheet, overlapping the respective borders having continuous fibers of the third sheet and an unseamed border of one of the first and second sheets, and seaming the overlapping borders; the polymer layers of the sheets being coupled and the reinforcing fabric layer secured therebetween by a method selected from heat laminating, pressure laminating, or combinations thereof; and the seaming step includes a method selected from laminating, heat seaming, ultrasonic seaming, factory solvent seaming, electrical conduction seaming, electromagnetic induction seaming, electrical resistance seaming, electrical resistance heating, or combinations thereof.

In general, in one aspect, the invention features a method of making a continuous reinforced composite material including the steps of providing a first sheet having two polymer layers and a reinforcing fabric layer and a tie layer disposed between the polymer layers, the fabric layer having at least some continuous fibers without free ends on at least one border of the first sheet, providing a second sheet having two polymer layers and a reinforcing fabric layer and a tie layer disposed between the polymer layers, the fabric layer having at least some continuous fibers without free ends on at least one border of the second sheet, overlapping the respective borders having continuous fibers of the first and second sheet, and seaming the first sheet and the second sheet at the overlapping borders.

Implementations of the invention include one or more of the following features. The method of making a continuous reinforced composite material includes: providing a third sheet having two polymer layers and a reinforcing fabric layer and a tie layer disposed between the polymer layers, the fabric layer having at least some continuous fibers without free ends on at least one border of the third sheet, overlapping the respective borders having continuous fibers of the third sheet and an unseamed border of one of the first and second sheets, and seaming the overlapping borders; the polymer layers of the sheets are coupled and the reinforcing fabric layer and the tie layer are secured by a method selected from heat laminating, pressure laminating, or combinations thereof; and the seaming step includes a method selected from laminating, heat seaming, ultrasonic seaming, factory solvent seaming, electrical conduction seaming, electromagnetic induction seaming, electrical resistance seaming, electrical resistance heating, or combinations thereof.

Among the advantages of the invention may be one or more of the following. The continuous reinforced composite material has enhanced seam strength and increased tear resistance. The increased tear resistance results from the reduced separation of reinforcing fibers within the scrim formed individual sections during tensile loading of the continuous reinforced composite material. Because the seam between the two sheets of reinforced composite material retains or exceeds the performance capacity of the individual sections, continuous reinforced composite materials having a large surface area and/or irregular shape may be produced. Therefore, the continuous reinforced composite materials may be utilized in a wide variety of industrial, transportation, and engineering applications.

Other advantages and features will become apparent from what follows.

DESCRIPTION

Figure 1:
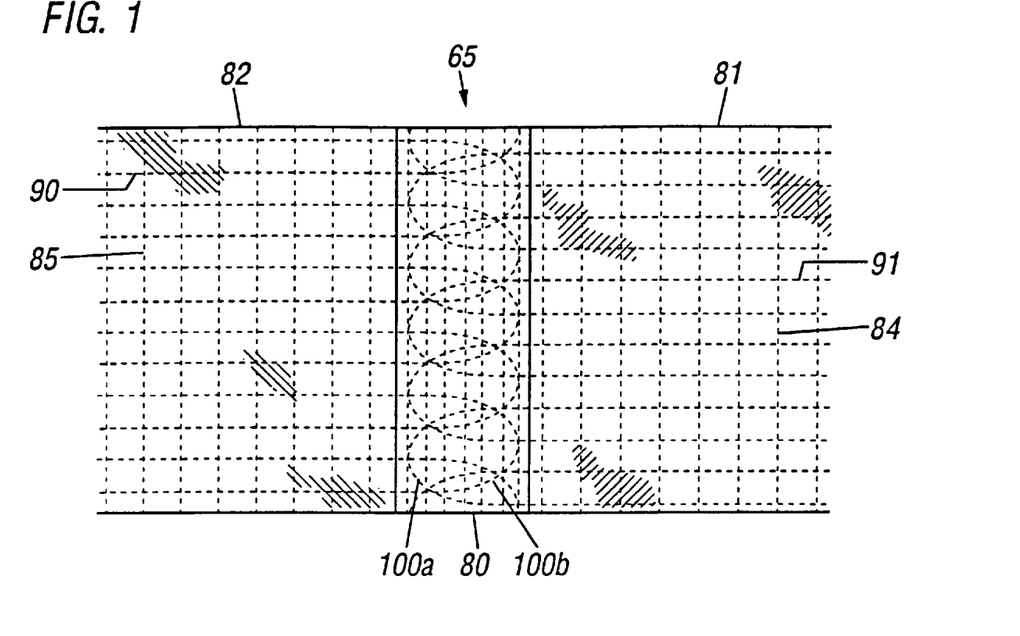
FIG. 1 is a top view of a continuous reinforced composite material according to one embodiment of the invention.

Referring to FIG. 1, a continuous reinforced composite material 65 may be formed by overlapping and coupling a first sheet of reinforced composite material 81 and a second sheet of reinforced composite material 82 to form a seam 80. Each sheet of reinforced composite material 81, 82 includes at least two polymer film layers (see cross-sections FIGS. 6A, 6B, 7A, and 7B) between which is coupled a fabric layer or scrim with a plurality of horizontal reinforcing fibers 84, 85 referenced for example and a plurality of longitudinal reinforcing fibers 90, 91 referenced for example. As shown in the figures all of the longitudinal reinforcing fibers are continuous (i.e., having no free ends) and loop or terminate in a plurality of arcs referenced as 100a and 100b in FIG. 1 along a border of the reinforced composite material sheets 81, 82 at the seam 80. The arcs of the respective reinforced composite material sheets 81, 82 overlap at the seam 80. In other embodiments, only some of the longitudinal fibers are continuous at the borders and the seam.

Figure 2:
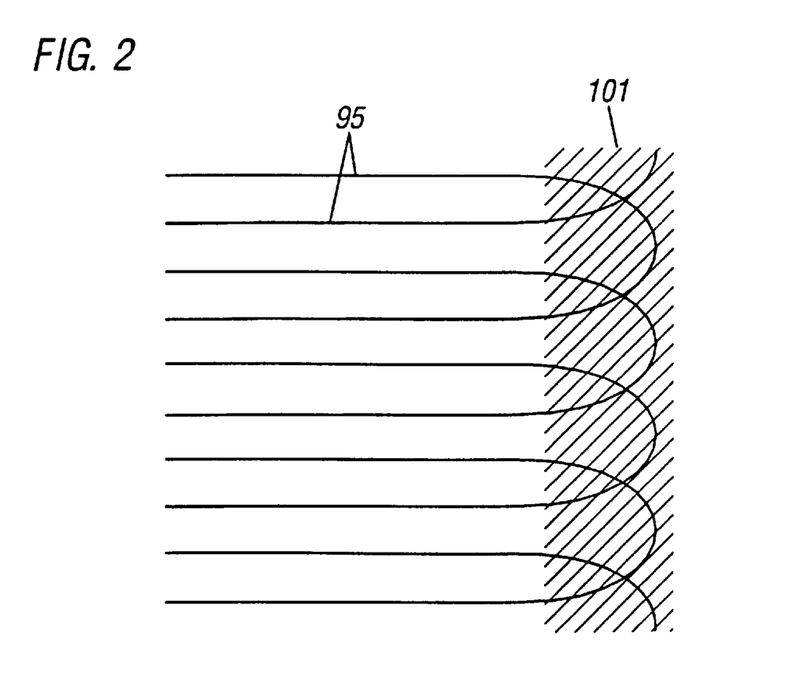
FIG. 2 is a top view of a reinforced composite material according to one embodiment of the invention.

FIG. 2 is a blow-up of one of the reinforced composite sheets of the invention showing the continuous fibers forming arcs along border 101. The longitudinal fibers 95 are illustrative of the plurality of fibers that are continuous at the border.

Although the longitudinal reinforcing fibers 95 are illustrated in the figures as looping or terminating in arcs 100, alternatively, they may loop or terminate in a wide variety of shapes or patterns, including, but not limited to, a tapered point, a square, or combinations thereof. Each loop or termination (e.g., a single arc) may also be a complex geometric shape such as knots, corrugations, or multiple loops. In addition, some, but not all, of the longitudinal reinforcing fibers may loop or terminate without free ends. Similarly, although the pattern formed by the longitudinal and horizontal reinforcing fibers is illustrated as a grid of squares in the figures, a wide variety of patterns known in the art (e.g., rectangular or diamond patterns) are compatible with the invention. Moreover, no particular alignment of the fibers at the seam of each sheet is required so long as the loops overlap therein.

Figure 3:
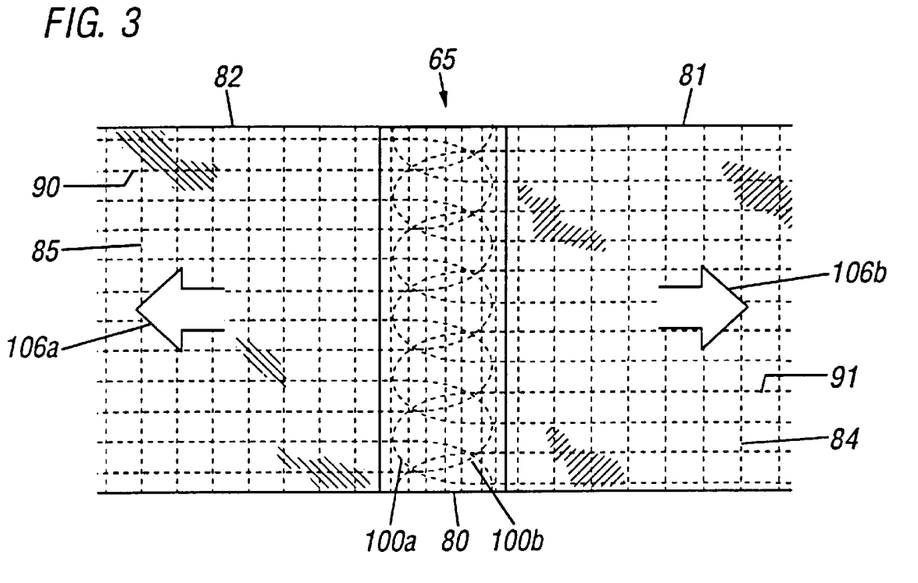
FIG. 3 is a top view of a continuous reinforced composite material according to one embodiment of the invention under longitudinal tension.
Figure 4:
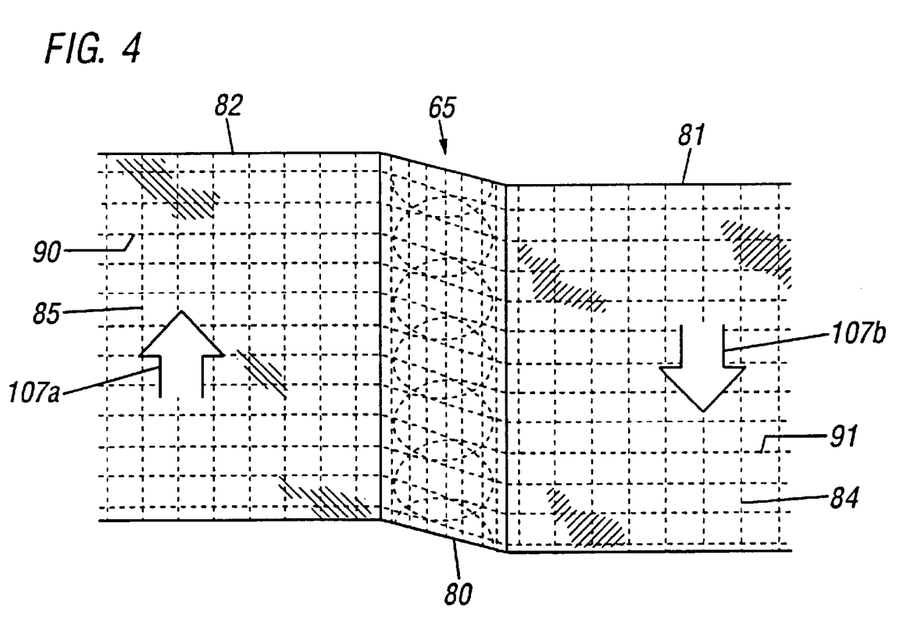
FIG. 4 is a top view of a continuous reinforced composite material according to one embodiment of the invention under horizontal tension.
Figure 5:
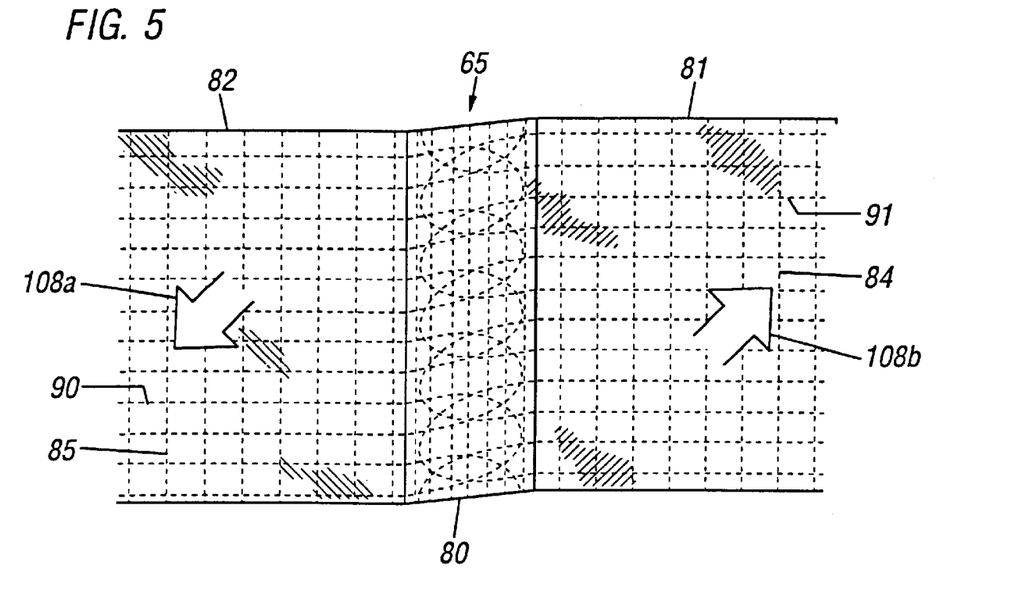
FIG. 5 is a top view of a continuous reinforced composite material according to one embodiment of the invention under diagonal tension.

Referring to FIGS. 3, 4, and 5, the overlapping pattern of continuous reinforcing fibers having no free ends reduces significantly the separation of the horizontal reinforcing fibers and/or the longitudinal reinforcing fibers at seam 80 when the continuous reinforced composite material 65 is placed under longitudinal, horizontal, and diagonal tensile loads (e.g., as depicted by arrows 106a, 106b, 107a, 107b, 108a, and 108b, respectively). As the data in Tables 1–6 demonstrate, reductions in fiber separation enhance the seam strength of continuous reinforced composite materials containing longitudinal reinforcing fibers without free ends as compared to those having free ends. Within the seam 80, the arrangement of the reinforcing fibers is essentially unchanged during longitudinal tensile loading. However, at the edges of the seam 80, the longitudinal reinforcing fibers are angled toward the load vector during horizontal and diagonal tensile loading (see FIGS. 4 and 5). At this point, the straight portion of the longitudinal reinforcing fibers bear a significant portion of the tensile force, and, thus, are susceptible to breakage at excessive loads.

TABLE 1

SEAM PROPERTIES OF A CONTINUOUS REINFORCED COMPOSITE MATERIAL FORMED FROM Fema 2267 Fr Blue
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| 1 | 58 | 50 | Edge of Seam | 1 | 70 | 50 | Bottom Grip |
| 2 | 58 | 50 | Top Grip | 2 | 82 | 46 | Bottom Grip |
| 3 | 56 | 44 | Top Grip | 3 | 72 | 49 | Top Grip |
| 4 | 56 | 50 | Top Grip | 4 | 78 | 50 | Bottom Grip |
| 5 | 57 | 49 | Top Grip | 5 | 80 | 46 | Top Grip |
| 6 | 53 | 50 | Top Grip | 6 | 70 | 47 | Top Grip |
| 7 | 53 | 48 | Top Grip | 7 | 78 | 49 | Top Grip |
| 8 | 52 | 48 | Top Grip | 8 | 82 | 52 | Edge of Seam |
| 9 | 54 | 45 | Edge of Seam | 9 | 78 | 46 | Top Grip |

TABLE 1-continued

SEAM PROPERTIES OF A CONTINUOUS REINFORCED COMPOSITE
MATERIAL FORMED FROM Fema 2267 Fr Blue
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| Avg | 55 | 48 | | Avg | 77 | 48 | |

TABLE 2

SEAM PROPERTIES OF A CONTINUOUS REINFORCED COMPOSITE
MATERIAL FORMED FROM TX Clear 2267
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| 1 | 49 | 44 | Bottom Grip | 1 | 74 | 44 | Edge of Seam |
| 2 | 52 | 48 | Top Grip | 2 | 80 | 43 | Bottom Grip |
| 3 | 52 | 46 | Edge of Seam | 3 | 88 | 44 | Top Grip |
| 4 | 52 | 44 | Bottom Grip | 4 | 74 | 40 | Top Grip |
| 5 | 50 | 44 | Top Grip | 5 | 74 | 42 | Edge of Seam |
| 6 | 54 | 42 | Top Grip | 6 | 87 | 45 | Edge of Seam |
| 7 | 53 | 43 | Edge of Seam | 7 | 82 | 52 | Edge of Seam |
| 8 | 53 | 41 | Top Grip | 8 | 74 | 42 | Bottom Edge |
| 9 | 54 | 44 | Edge of Seam | 9 | | | |
| Avg | 52 | 44 | | Avg | 79 | 44 | |

TABLE 3

SEAM PROPERTIES OF A CONTINUOUS REINFORCED COMPOSITE
MATERIAL FORMED FROM TX White 2267
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| 1 | 65 | 44 | Bottom Grip | 1 | 78 | 62 | Bottom Grip |
| 2 | 62 | 56 | Top Grip | 2 | 88 | 52 | Bottom Grip |
| 3 | 66 | 57 | Top Grip | 3 | 85 | 56 | Bottom Grip |
| 4 | 68 | 56 | Top Grip | 4 | 92 | 48 | Top Grip |
| 5 | 69 | 55 | Top Grip | 5 | 92 | 49 | Top Grip |
| 6 | 71 | 56 | Top Grip | 6 | 88 | 44 | Bottom Grip |
| 7 | 70 | 56 | Top Grip | 7 | 82 | 44 | Bottom Grip |
| 8 | 65 | 56 | Edge of Seam | 8 | 92 | 50 | Bottom Grip |
| Avg | 67 | 57 | | Avg | 87 | 51 | |

TABLE 4

SEAM PROPERTIES OF A CONTINUOUS REINFORCED COMPOSITE
MATERIAL FORMED FROM TX 2150 Double Pass Black
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| 1 | 49 | 67 | Top Grip | 1 | 84 | 65 | Top Grip |
| 2 | 52 | 67 | Top Grip | 2 | 77 | 65 | Top Grip |
| 3 | 50 | 72 | Top Grip | 3 | 80 | 62 | Top Grip |
| 4 | 49 | 68 | Top Grip | 4 | 79 | 70 | Bottom Grip |
| 5 | 50 | 68 | Top Grip | 5 | 78 | 69 | Top Grip |
| 6 | 52 | 67 | Bottom Grip | 6 | 77 | 67 | Top Grip |
| 7 | 52 | 74 | Top Grip | 7 | 71 | 65 | Bottom Grip |
| 8 | 49 | 78 | Top Grip | 8 | 75 | 67 | Top Grip |
| Avg | 50 | 70 | | Avg | 78 | 66 | |

TABLE 5

SEAM PROPERTIES OF A CONTINUOUS REINFORCED COMPOSITE
MATERIAL FORMED FROM TX2150 Clear
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| 1 | 54 | <50 | Top Grip | 1 | 70 | Approx 52 | Top Grip |
| 2 | 50 | <50 | Bottom Grip | 2 | 68 | Approx 52 | Top Grip |
| 3 | 55 | <50 | Top Grip | 3 | 66 | Approx 52 | Edge of Seam |
| 4 | 52 | <50 | Top Grip | 4 | 65 | Approx 52 | Bottom Grip |
| 5 | 54 | <50 | Edge of Seam | 5 | 63 | Approx 52 | Top Grip |
| 6 | 51 | <50 | Edge of Seam | 6 | 60 | Approx 52 | Top Grip |
| 7 | 50 | <50 | Top Grip | 7 | 60 | Approx 52 | Edge of Seam |
| 8 | 49 | <50 | Bottom Grip | 8 | 62 | Approx 52 | Edge of Seam |
| Avg | 52 | <50 | | Avg | 64 | Approx 52 | |

TABLE 6

SEAM PROPERTIES OF A CONTINUOUS REINFORCED COMPOSITE
MATERIAL FORMED FROM TX2150 Blue
Grab Tensile
D-751A

| | NO LOOP | | | | LOOPED | | |
|---|---|---|---|---|---|---|---|
| Sample # | Load @ Yield (lbf) | Load @ Break (lbf) | Type of Break | Sample # | Load @ Yield (lbf) | Load @ Break (lbf) | Type of Break |
| 1 | 56 | <50 | Bottom Grip | 1 | 66 | Approx 55 | Top Grip |
| 2 | 54 | <50 | Bottom Grip | 2 | 66 | Approx 55 | Top Grip |
| 3 | 54 | <50 | Top Grip | 3 | 61 | Approx 55 | Edge of Seam |
| 4 | 57 | <50 | Bottom Grip | 4 | 70 | Approx 55 | Top Grip |
| 5 | 55 | <50 | Bottom Grip | 5 | 67 | Approx 55 | Top Grip |
| 6 | 53 | <50 | Bottom Grip | 6 | 66 | Approx 55 | Top Grip |
| 7 | 59 | <50 | Bottom Grip | 7 | 54 | Approx 55 | Top Grip |
| 8 | 54 | <50 | Bottom Grip | 8 | | | |
| Avg | 70 | <50 | | Avg | 64 | Approx 55 | |

Polymers have a low stiffness and are a ductible material (i.e., they will elongate after yield in a uniaxial tension test). A typical load-extension test of a polymer film progresses to a yield stress point. This yield stress point or load at yield is the point at which the elastic deformation of the polymer ends. After the yield point there is a drop in true stress or a decrease in load with continuing elongation and strain hardening. This is associated with the polymer increasing its effective stiffness. With further load-extension, the material failure point is reached. The load at break or fracture is the point where the molecules of the material actually separate and elongation ends.

Composites utilize the high strength of fibers to stiffen and strengthen a polymer material. Incorporation of fibers into the composite leads to a progressive and not a sudden failure. Composites having fibers that are aligned along the loading direction of the polymer possess stiffness and strength that are proportional to the percentage of the volume fractions of the polymer and the fibers. The resulting increase in strength does not necessarily reflect a linear relationship between the volume fractions of polymer and fibers. The load-extension or stress-strain profile of a composite varies from that of a non-composite polymer film. The load-extension progresses linearly until the polymer of the composite yields. From that point, most of the load is carried by the fibers which continue to stretch elastically until they fracture. The stress then drops to the yield strength of the polymer. The polymer continues elongation, undergoes strain hardening, and increases in effective stiffness until the point of fracture or failure is reached.

It is the yield stress or load at yield, much more than does the ultimate fracture or load at break, which defines the practical limit of performance for the composite. At the yield stress or load at yield, the fibers are at the point of breaking and the polymer has yielded. The composites produced with end looping as opposed to no end looping achieve a higher load at yield point (see Tables 1–6). The fibers in the seams with the no loop fiber reinforcement impart some benefit to the composite when a load is applied. The fibers in the film under strain pull out of the matrix, and in so doing require work to be done which contributes to the toughness of the composite. However, the fibers in the seams with the loops provide an even greater contribution. The looping does not allow the fibers to slip and there is a greater contribution imparted by the strength of the fiber, requiring the fiber to reach its breaking point before elongation of the matrix occurs.

Reinforced composite materials having reinforcing fibers oriented as described above may be manufactured by techniques known to those skilled in the art. For example, one may manufacture a fabric layer or scrim having woven or non-woven reinforcing fibers. In addition, reinforcing fibers without free ends may be produced from a single fiber of the fabric or by other methods known in the art. Moreover, the properties and characteristics described for the longitudinal reinforcing fibers may be achieved for either the horizontal reinforcing fibers or both the longitudinal and horizontal reinforcing fibers. Sheets of composite material having multiple borders containing reinforcing fibers without free ends may also be produced. In this way, continuous reinforced composite materials having large surface area and/or irregular shapes may be created.

Figure 6A:
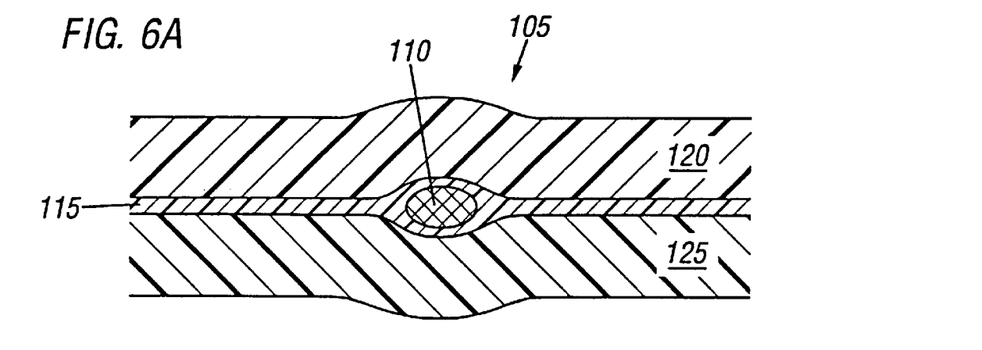
FIGS. 6A and 6B are cross-sectional views of a reinforced composite material according to an embodiment of the invention.
Figure 6B:
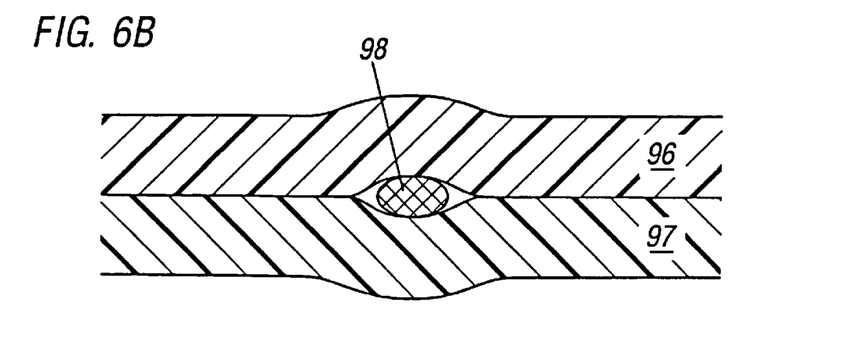

Referring to a cross-section in FIG. 6A, the continuous reinforced composite material may be formed from individual sheets of a reinforced composite material 105 including fabric layer fibers 110 and a tie layer 115 disposed between two polymer film layers 120, 125 to form a laminate. (See U.S. patent application Ser. No. 08/668,965, U.S. Pat. No. 5,773,373 entitled "Reinforced Laminate with Elastomeric Tie Layer" filed on Jun. 18, 1996 by Lyndell Kyle Wynne and Abdeally Mohammed, incorporated by reference herein). The tie layer 115 is formed from a material having a lower modulus than the polymer film layers 120, 125. The tie layer 115 may be an adhesive, an elastomer, or a plastomer. Referring to a cross-section in FIG. 6B, in another embodiment, the sheets of the reinforced composite material may include two polymer layers 96, 97 laminated together around a reinforcing material, typically a fabric 98. Laminates of this type are typically formed by heating setting.

Figure 7A:
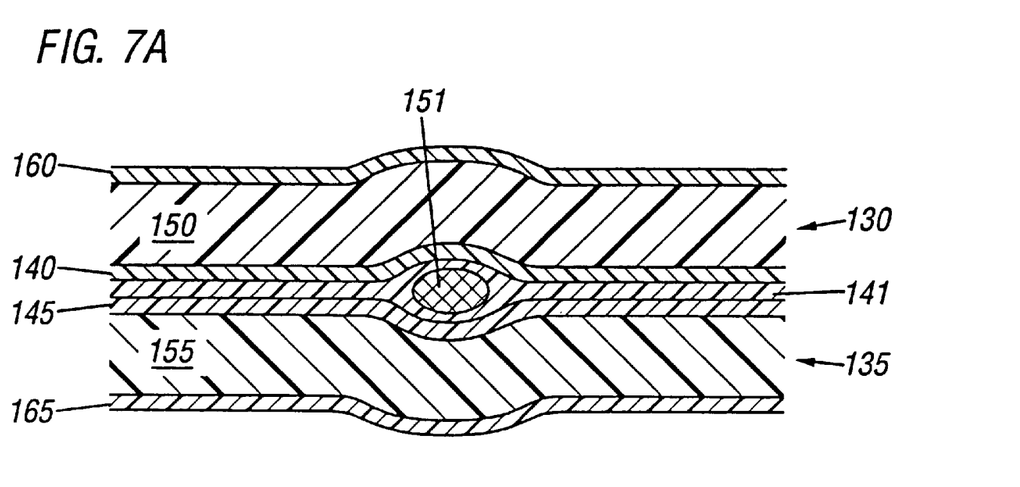
FIGS. 7A and 7B are cross-sectional views of a reinforced composite material according to an embodiment of the invention.
Figure 7B:
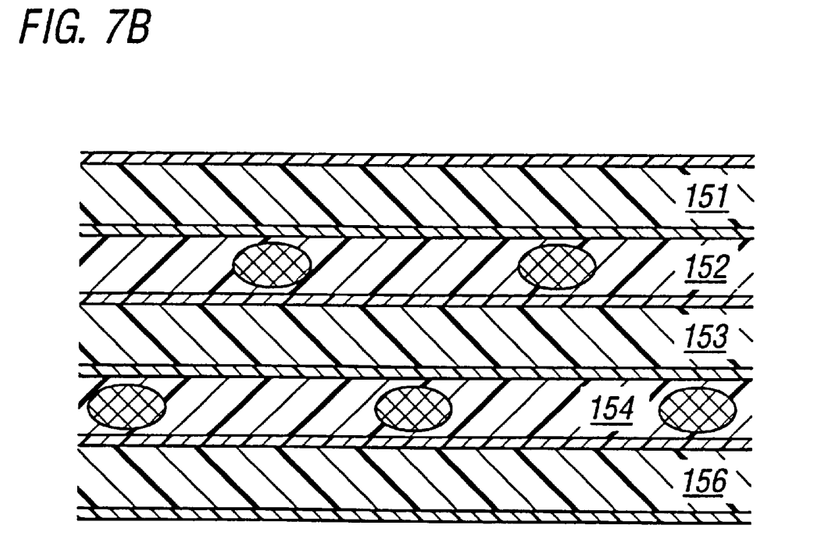

Referring to FIG. 7A, in another embodiment, the reinforced composite material may include multi-ply polymer layers 130, 135 having interior polymer films 140, 145, middle polymer films 150, 155, and exterior polymers films 160, 165, respectively. The Multi-ply polymer layers 130, 135 are coupled to the tie layer 141 around the reinforcing material 151 (shown in cross-section). The multi-ply polymer layers are typically formed by coextrusion, and may include interior, middle, and exterior polymer layers having varied compositions, additives, and thicknesses. The thickness of the coextruded layers generally ranges from 15%–25% and 50%–70% of total polymer layer thickness for each of the interior and exterior layers and the middle layer, respectively. In one embodiment, the interior and exterior layers each represent 15% and the middle layer represents 70% of the total multi-ply polymer thickness. Referring to FIG. 7B, in another embodiment, the reinforced composite material may include two tie layers 152, 154 each having a reinforcing grid. Multi-ply polymer layer 153 is disposed between and layers 151 and 156 are coupled around the tie layers 152, 154, respectively. In all of these embodiments, the polymer layers, the tie layers, and/or the fabric fiber layers may include additives which enhance performance in particular environments and/or applications.

A number of polymers can be used for the polymer and tie layers in the manufacture of the reinforced composite material. The following thermoplastic polymers may be used including ethylene acrylic acid, polyvinyl chloride (PVC), ethylene-vinyl acetate copolymer, ethylene-propylene-diene, polypropylene, high density polyethylene, low density polyethylene, and linear low density polyethylene. The following general categories of olefin hydrocarbon based polymers can also be used including higher olefin based polymers, copolymers of olefins substituted with ethylene, propylene, butene, and higher olefins, copolymers with vinyl esters and acrylic based materials, copolymers with carboxyl containing monomers, natural rubber and polyisoprene, butadiene rubber, and copolymers of butadiene with polystyrene and polyacrylonitrile, butyl rubber, chlorobutyl rubber, chlorosulfonated polyethylene rubber. Also, substituted ethylenic polymers can be used including polystyrene, copolymers with polybutadiene, acrylonitrile and methyl methacrylate, rubber modified polystyrene, acrylic polymers, polyvinyl esters, and derived polyvinyl esters, chlorine substituted ethylene, copolymers of vinyl chlorides with vinyl esters, fluorine and fluorochlorine containing polymers.

In addition, heterochain thermoplastics can be used including polyamides and polypeptides, polyesters, polyethers, polyurethanes, polycarbonates, polysulfide polymers, cellulose derivative polymers, polyimides, polyphenylene oxide, polyarylate, and ketones. Thermosetting polymers including phenol-aldehyde condensation products, urea-formaldehyde and melamine formaldehyde products, unsaturated polyester resins, epoxy resins, polyurethanes, silicones, alkyd polymers, allyl polymers, and diallyl phthalate polymers can be used. In addition, mixtures of different polymers can be used. The preceding list is not, however, intended to limit the invention to the use of any particular type of polymer.

Certain elastomers with a relatively low modulus which are suitable for use as a tie layer material include butyl rubber, PVC, polyurethane, neoprene, and ethylene propylene diene (EDPM). These materials need to be dissolved in water or solvents for processing. In addition, ethylene-methyl acrylate (EMA) and ethylene vinyl acetate (EVA) have a lower modulus than the polyethylenes and polypropylenes often used for laminates. The EMA and EVA resins are heavy, tacky and not as tough as other alternatives for the tie layer, as well as being difficult to process.

Another group of elastomeric materials suitable for use as the tie layer are polyolefin elastomers manufactured by the co-polymerization of ethylene or propylene with monomers, such as propylene, butene, hexene, octene, methyl acrylate, and vinyl acetate using either gas-phase or solution process technology. This comonomer prevents formation of crystallinity, and lowers the density and modulus of the polymer. The crystallinity of the polymer determines the stiffness or flexibility of the polymer, the crystallites "tie together" the polymer chains restricting motion and making them stiff. In the absence of these crystallites the entangled mass of contorted chains will tend to "straighten out" or uncoil when deformed, and will tend to coil up again when the restraining force is removed, thereby displaying elastic or rubbery behavior. Typical polyolefin materials exist as partly crystalline solids at normal temperatures, with crystallinity in the range of 40–60%, whereas the crystallinity of a comonomer ranges from 1–6%.

Another type of elastomeric polymer achieves and maximizes the physical properties required for a flexible reinforced laminate such as flexibility, tear resistance, puncture resistance, and environmental performance. Referred to as plastomers (Exxon and Dow) or Catalloy resins (Himont), these polyolefin resins are soft and resilient, like elastomers, and are free flowing pellets that can be processed with traditional equipment, like plastics. Polypropylene Catalloy resins are used when the outer skin layers are made from polypropylene. Polyethylene plastomer resins are used with polyethylene skin films.

The co-polymerized elastomers are lower modulii, lower crystallinity, higher flexibility, and melt processable resins achieved by the incorporation of high levels of comonomer in either a polyethylene (Dow and Exxon) or polypropylene (Himont, Fina, Shell) chain. Typically, a polyethylene elastomeric tie resin is used where the outer sheets are polyethylene based, and polypropylene elastomeric tie resin is used in case of polypropylene outer sheets. The polyethylene resins are substantially linear olefins within a narrow molecular weight distribution. In one embodiment, the resins can vary in density from 0.860 to 0.920 g/cc and in comonomer concentration from 20% to 6%. In another embodiment, the density ranges from 0.890 to 0.910, with a tensile modulus (1% secant—D882) in the range of 5000–15000 psi.

Additives to enhance the properties of the polymer sheet, the plies of a multi-ply polymer layer, or the tie layer may be used. Additives known to those skilled in the art include, but are not limited to, fire and flame retardants, static and corrosion retardants, colorants and pigments, ultraviolet absorbers and stabilizers, biocides, fillers, extenders, antioxidants, vulcanizers, and impact modifiers. The polymer layer may be any thickness, but generally ranges from about 3 mil to about 100 mil, depending on the application.

The fabric layer or scrim can be made from synthetic fiber forming polymers, naturally occurring fibers, and mixtures thereof. In one embodiment, the reinforcing grid is 200 to 800 denier yarn in a crisscross pattern. The grid is filamentous and made of single strand or multiple filament yarn of nylon, polyester, fiberglass, or blends thereof. The reinforcing grid is spaced about 0.5 inches apart and can be any spacing desired, but generally forms a one-eighth inch to a two inch grid. Fiber properties can be enhanced using additives known to those in the art including, but not limited to, fire retardants, colorants, ultraviolet absorbers, ultraviolet stabilizers, and antioxidants. The invention is not intended to be limited to any particular type of fabric and/or additive.

Figure 8:
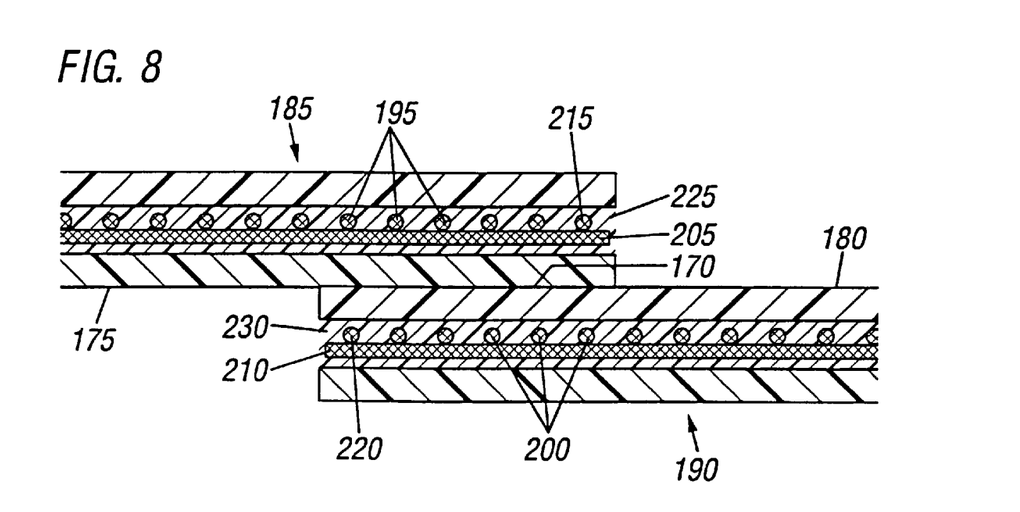
FIG. 8 is a cross-sectional view of a seam of a continuous reinforced composite material according to one embodiment of the invention.

Referring to FIG. 8, a seam 170 is formed between the polymer layers 175, 180 of the reinforced composite material sheets 185, 190. Within seam 170, the horizontal reinforcing fibers as exemplified at reference numerals 195, 200 and the longitudinal reinforcing fibers as exemplified at reference numerals 205, 210 overlap. In addition, the longitudinal reinforcing fibers 205, 210 extend beyond the terminal horizontal reinforcing fibers 215, 220. The reinforced composite material sheets also include a tie layer 225, 230. The tie layer 225, 230 extends beyond the outermost horizontal reinforcing fibers 215, 220 and the turning point for the longitudinal reinforcing fibers 205, 210. In one embodiment, the seam 170 is formed by electrical resistance heating of the overlapping composite materials 185, 190. Heating of the composite materials 185, 190 results in a blending of the polymer layers 175, 180 such that the clear demarcation between them at the seam 170 is substantially reduced or eliminated. Preferably, the polymer layers 175, 180 are melted together to form a well bonded and smooth seam, while avoiding the formation of a brittle surface or curled edges of the polymer layers. Alternatively, the seam may be formed by any type of polymer joining process including laminating, heat seaming, ultrasonic seaming, factory solvent seaming, electrical conduction seaming, electromagnetic induction seaming, and combinations thereof.

Figure 9:
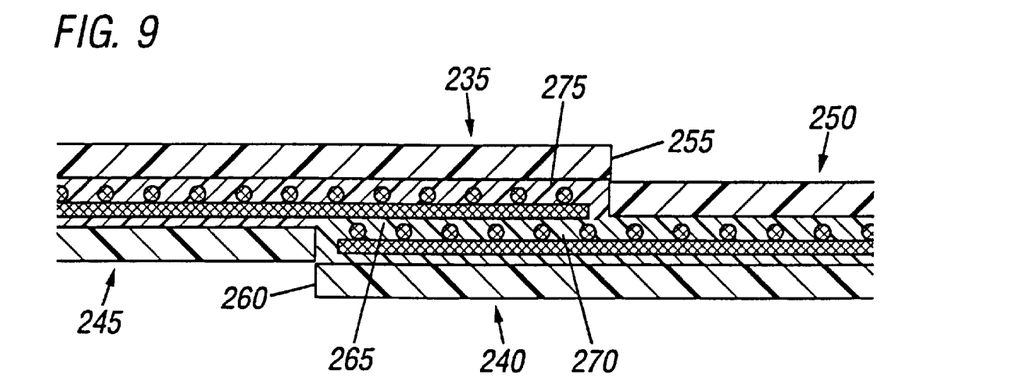
FIG. 9 is a cross-sectional view of a seam of a continuous reinforced composite material according to one embodiment of the invention.

Referring to FIG. 9, in one embodiment, the borders 235, 240 of the reinforced composite material sheets 245, 250 include a polymer film layer 255, 260 on only one side. The seam 265 is formed as described above, with the exception that the interface between the composite material sheets 245, 250 is formed by coupling the tie layers 270, 275 to one another. In other embodiments, the reinforced composite materials illustrated in FIGS. 6A, 7A, and 7B are overlapped and seamed as described above.

Because the size and/or shape of the continuous reinforced composite materials described above are not limited by the practical and economic constraints associated with the manufacture of mill roll goods, the continuous reinforced composite material may be used in a wide variety of applications. For example, the continuous reinforced composite material may be used for covering, protecting, and/or containing materials in a wide variety of settings including material stored in open yards (e.g., building materials, landscaping materials, and refuse), and materials deposited in containers (e.g., excavated containment sites, ship cargo hulls, rail cars, truck beds, and aircraft cargo bays). Likewise, the continuous reinforced composite material may be useful for lining excavated containment sites, ship cargo hulls, rail cars, truck beds, and aircraft cargo bays.

In any given application, the continuous reinforced composite material is formed by first providing a plurality of sheets of a reinforced composite material. Each sheet includes at least two polymer layers between which are disposed a reinforcing fabric layer or scrim. A border of each sheet includes continuous fibers having no free ends. The respective borders having continuous fibers of each sheet are overlapped and a seam is formed at the overlapping borders. In one embodiment, each sheet includes multiple borders having continuous fibers thereby allowing seams to be formed at multiple borders of one or more sheets. In either embodiment, the sheets may also include a tie layer disposed with the reinforcing fabric layer between the polymer layers. As detailed above, a wide variety of methods known to those skilled in the art may be used for coupling the polymer layers around the fabric layer and the tie layer, and creating the seam(s) between the sheets of reinforced composite material.

Other embodiments are within the scope of the following claims.

What is claimed is:

1. A method of making a continuous reinforced composite material, comprising the steps of:
   providing a first sheet having two polymer layers and a reinforcing fabric layer disposed between the polymer layers, the fabric layer having at least some continuous fibers without free ends on at least one border of the first sheet;
   providing a second sheet having two polymer layers and a reinforcing fabric layer disposed between the polymer layers, the fabric layer having at least some continuous fibers without free ends on at least one border of the second sheet;
   overlapping the respective borders having continuous fibers of the first and second sheet; and
   seaming the first sheet and the second sheet at the overlapping borders.

2. The method of claim 1, further comprising the steps of:
   providing a third sheet having two polymer layers and a reinforcing fabric layer disposed between the polymer layers, the fabric layer having at least some continuous fibers without free ends on at least one border of the third sheet;
   overlapping the respective borders having continuous fibers of the third sheet and an unseamed border of one of the first and second sheets; and
   seaming the overlapping borders.

3. The method of claim 1, wherein the polymer layers of the sheets are coupled and the reinforcing fabric layer secured therebetween by a method selected from the group consisting of heat laminating, pressure laminating, and combinations thereof.

4. The method of claim 1, wherein the seaming step comprises a method selected from the group consisting of laminating, heat seaming, ultrasonic seaming, factory solvent seaming, electrical conduction seaming, electromagnetic induction seaming, electrical resistance seaming, electrical resistance heating, and combinations thereof.

5. A method of making a continuous reinforced composite material, comprising the steps of:
   providing a first sheet having two polymer layers and a reinforcing fabric layer and a tie layer disposed between the polymer layers, the fabric layer having at least some continuous fibers without free ends on at least one border of the first sheet;
   providing a second sheet having two polymer layers and a reinforcing fabric layer and a tie layer disposed between the polymer layers, the fabric layer having at least some continuous fibers without free ends on at least one border of the second sheet;
   overlapping the respective borders having continuous fibers of the first and second sheet; and
   seaming the first sheet and the second sheet at the overlapping borders.

6. The method of claim 5, further comprising the steps of:
   providing a third sheet having two polymer layers and a reinforcing fabric layer and a tie layer disposed between the polymer layers, the fabric layer having at least some continuous fibers without free ends on at least one border of the third sheet;
   overlapping the respective borders having continuous fibers of the third sheet and an unseamed border of one of the first and second sheets; and
   seaming the overlapping borders.

7. The method of claim 5, wherein the polymer layers of the sheets are coupled and the reinforcing fabric layer and the tie layer are secured by a method selected from the group consisting of heat laminating, pressure laminating, and combinations thereof.

8. The method of claim 5, wherein the seaming step comprises a method selected from the group consisting of laminating, heat seaming, ultrasonic seaming, factory solvent seaming, electrical conduction seaming, electromagnetic induction seaming, electrical resistance seaming, electrical resistance heating, and combinations thereof.

* * * * *